Figure 4:
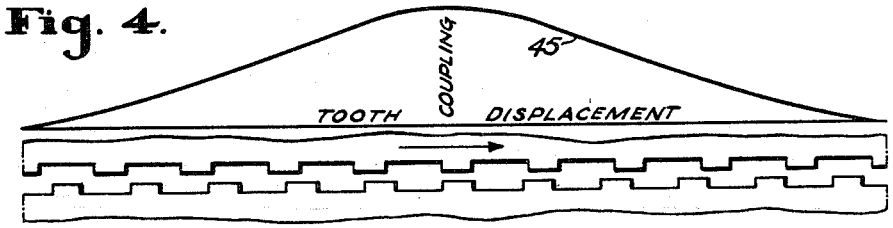

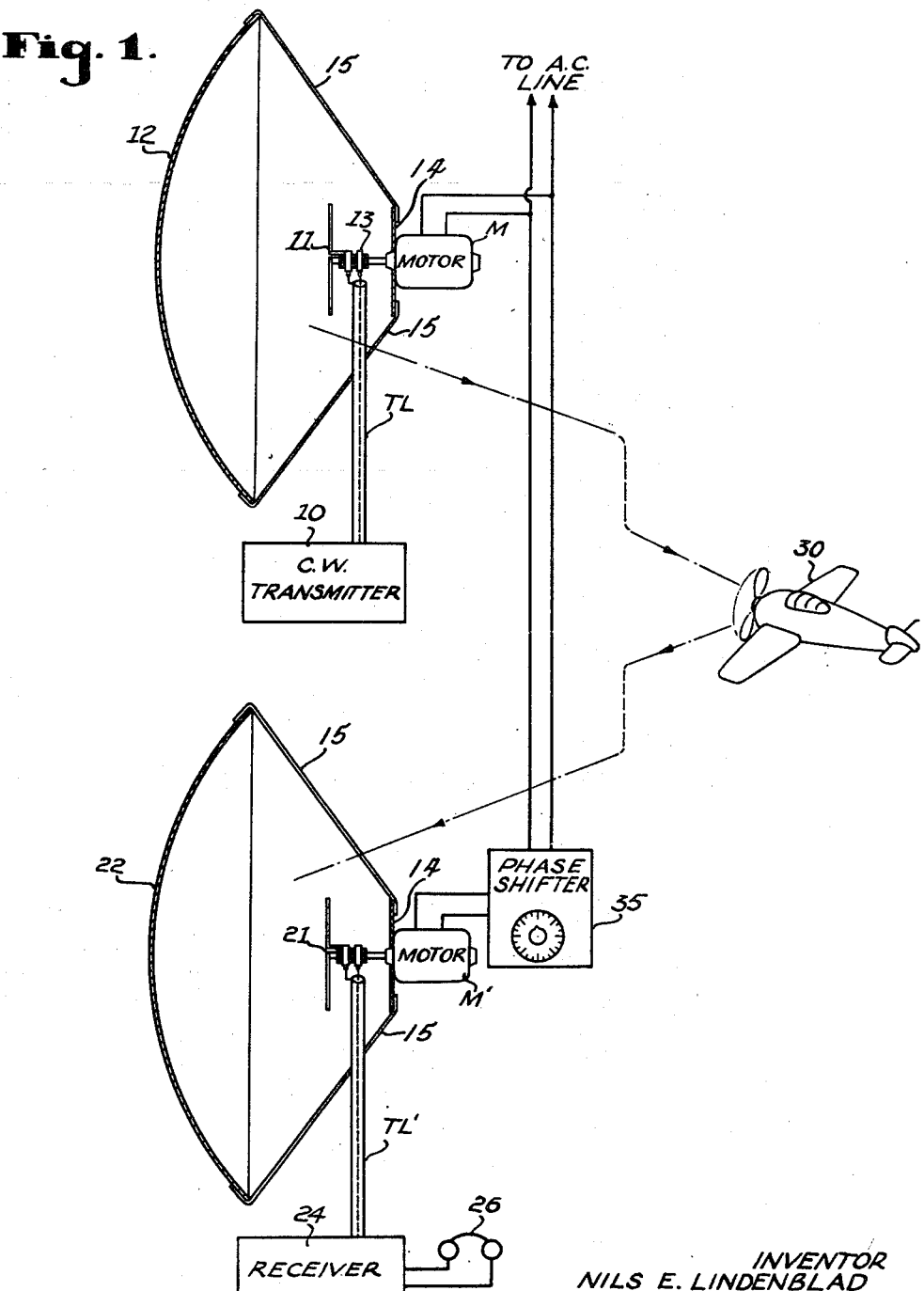

INVENTOR
NILS E. LINDENBLAD
BY H. G. Grover
ATTORNEY

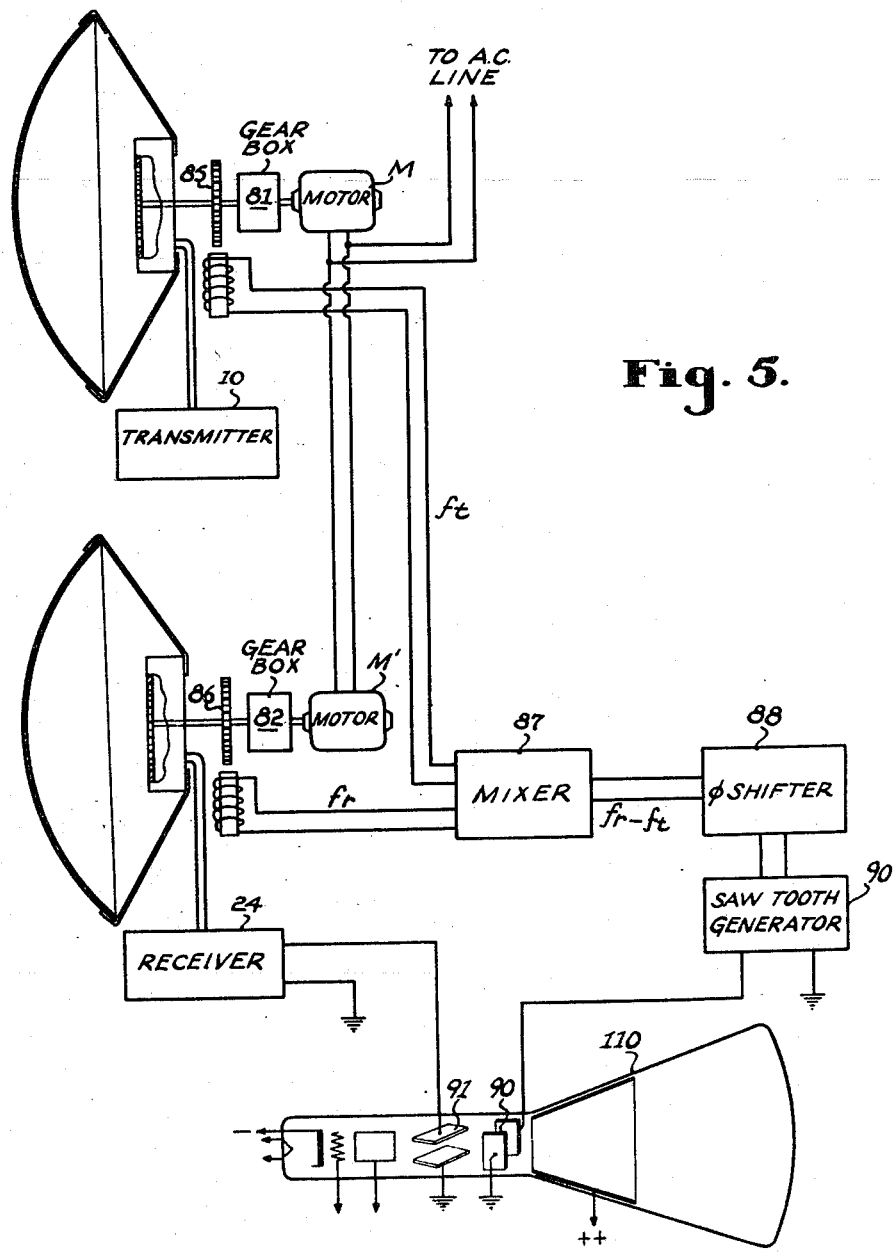

Patented Feb. 6, 1951

2,540,536

UNITED STATES PATENT OFFICE 2,540,536

OBSTACLE DETECTION SYSTEM

Nils E. Lindenblad, Rocky Point, N. Y., assignor to Radio Corporation of America, a corporation of Delaware Application September 9, 1944, Serial No. 553,321

6 Claims. (Cl. 343—12)

The present invention relates to radio detecting and ranging systems, commonly known as "radar" systems. The invention relates more particularly to such systems which utilize continuous wave transmission rather than pulse transmission.

In some radio detecting and ranging systems which are at present in common use, stored energy is discharged in spurts of short duration in order that high amplitude levels of radiated energy may be used. However, when pulses of short duration are used, wide band receivers are required. In this way, more noise is admitted which tends to offset the gain in amplitude in the transmitted signal. In these systems, the primary object is the determination or recording of the time lapse between the transmission of a signal toward a reflecting object and its return. Accurate time measurements do not necessarily require the choice of wide band modulation methods, and it is an object, therefore, of the present invention to utilize continuous wave systems for determining the distance and location of a reflecting object from a given location, said system not requiring wide band modulation methods.

A further object of the present invention is to provide a radar system which may be readily adapted from conventional and easily obtained equipment.

A further object of the present invention is the provision of a locating and ranging system which is not appreciably affected by frequency drift.

A further object of the present invention is the provision of a radio directing and ranging system which is more difficult to interfere with or "jam" than heretofore known systems.

Still a further object of the present invention is the provision of a radio directing and ranging system which depends upon the polarization sensitivity of a dipole for range indication.

Another object of the present invention is the provision of a new and improved antenna structure for use in a system as aforesaid.

Still another object of the present invention is the provision of an improved means for rotating the plane of polarization of an ultra high frequency radiator.

Still a further object of the present invention is the provision of means for rotating the plane of polarization of a high frequency radiator at a rate much greater than the physical speed of rotation of the rotating element.

The foregoing objects and other objects which may appear from the following detailed description are attained by providing a radio direction and ranging device utilizing a continuous wave transmitter and receiver connected to separate directive antennas which are locked together in the same direction so that their directivity patterns cover the same general area. The antennas are preferably arranged to be simultaneously adjusted in azimuth and elevation. The radiating means associated with each of the antennas is arranged to be rotated at a predetermined rate so that the plane of polarization of the transmitted signal is continuously rotated, while the plane of polarization of maximum sensitivity of the receiving antenna is simultaneously rotated at either the same rate or a different rate.

Arrangements are provided to vary the phase relationship between the planes of polarization of the transmitting and receiving antennas. The energy radiated from the transmitter is reflected from a distant reflective obstacle, and the reflected wave is picked up by the receiving antenna. Since the plane of polarization of the transmitted wave is constantly changing due to the rotation of the transmitting antenna, the plane of polarization of the received wave varies in accordance with the distance from a reflecting object to the transmitter and receiver. By suitably adjusting the phase of the plane of polarization of the receiving antenna with respect to that of the transmitting antenna, the received signal may be brought down to a minimum value.

It is then known that the receiving antenna is at right angles to the plane of polarization of the reflected signal. Thus by measuring the difference in the phase of the plane of polarization between the two antennas, a measure of the distance from the reflecting object to the transmitter and receiver may be obtained.

Since the speed of rotation of a dipole may be limited by mechanical considerations, it is a further purpose of this invention to provide means affording an increased rate of rotation of the plane of polarization beyond that possible with direct mechanical rotation.

This may be accomplished by the use of a disc shaped radiator of such dimensions that it exhibits diametrical half-wave tuning. Energy to be radiated by such a disc may then be induced therein with the plane of polarization in any direction in its own plane, the polarization depending purely on the geometry of the application of the feed. Now if the means for coupling energy from a transmitter to the disc is arranged to have its degree of coupling varied around the circumference of the disc more rapidly than the disc rotates, an increased rate of rotation of the plane of polarization may be obtained. This may be accomplished by utilizing a number of separate coupling members arranged like gear teeth on the circumference of the disc and a different number of similar coupling members surrounding the disc and connected to a source of high frequency energy such as a transmitter. The number of teeth on the circumference of the disc and the number surrounding the disc must bear a primed relationship, to each other, that is, there must be no least common denominator other than unity. The arrangement is somewhat similar to the calibration of a vernier scale. A vernier scale includes two slideable parallel scales of unequal numbers of divisions on the two scales. Thus one scale may have nine or eleven divisions in the space occupied by ten on the other scale. If it is assumed that a pair of divisions, one on each of the two scales, coincide, then by sliding one scale relative to the other by a distance of a half division, the places where the graduations coincide has moved to where there was before the greatest divergence. This distance is much larger than the actual motion of the scales. In the same way the point of coincidence between coupling members of the present antenna is moved around the entire circumference of the disc by a fraction of a revolution of the disc.

Figure 2:
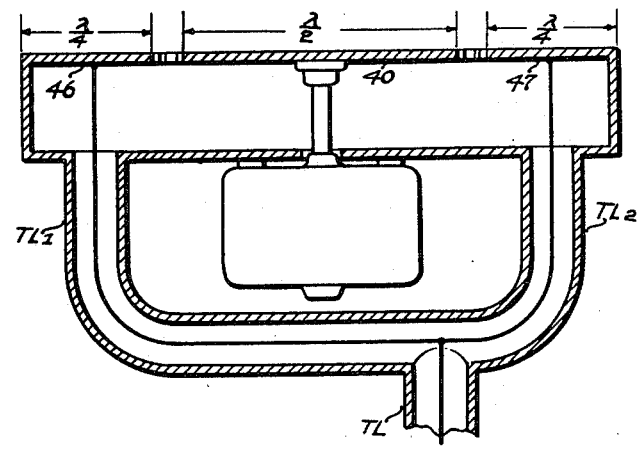
Figure 3:
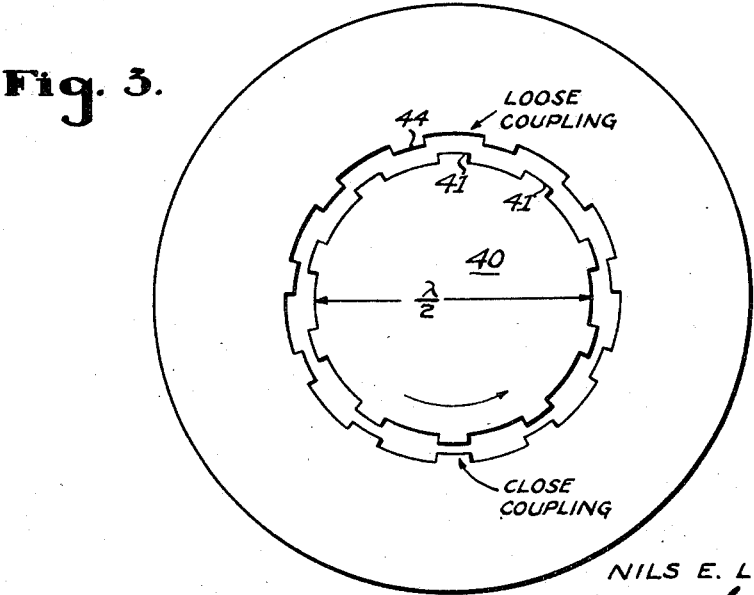

The present invention will be more fully understood by reference to the following detailed description which is accompanied by a drawing in which Figure 1 illustrates in simplified form a diagram of an embodiment of the present invention, while Figures 2 and 3 are sectional, elevation, and plan views of a radiator utilizing the principles of an aspect of the present invention, while Figure 4 is a linear development of a portion of the structure shown in Figures 2 and 3 for the purpose of making the operation of the device more clear, while Figure 5 is a simplified form of the showing of another form of the invention shown in Figure 1.

Referring now to Figure 1, reference numeral 10 indicates a continuous wave transmitter operating at a frequency, for example, of 300 megacycles corresponding to 1 meter wavelength. The output from the transmitter is applied to a directive antenna, including a rotatable dipole radiator 11 and a parabolic reflector 12 so arranged with respect to radiator 11 as to obtain a high directive beam of energy along the axis of reflector 12. A practical example of the mounting arrangement is shown comprising an annular disc 14 mounted on motor M on which reflector 12 is supported by means of a plurality of support strips 15 of which only two are shown in the figure. Mounted closely adjacent to the transmitting antenna is a receiving antenna, including a rotatable dipole radiator 21 and a parabolic reflector 22 similar to the radiator and reflector of the transmitting equipment. Reflector 22 may be mounted on motor M' by means of a disc 14 and strips 15 as indicated above for the transmitting antenna. The axes of directivity of antennas 12 and 22 should be arranged parallel to one another at all times. This may be assured by providing an arrangement (not shown) whereby the antennas are locked together in a gimbal arrangement so that they may be simultaneously swung in any direction in azimuth or elevation. Transmitting dipole 11 is arranged to be rotated at any given rate of speed by motor M and receiving dopile 21 is similarly arranged to be rotated by motor M'. These motors may be synchronous motors driven from a conventional alternating current power line as indicated.

I have shown in this figure a slip ring arrangement 13 between the rotating dipole 11 and the transmission line TL connected to the transmitter 10 in order to provide a continuous flow of energy from transmitter 10 to dipole 11 as the latter is rotated. The slip rings are shown only for the purpose of explaining the principles of operation of the system. A preferred structure for energizing the antenna while permitting rotation thereof will be described in detail later with reference to other figures of the drawing. However, for the purpose of explaining the principles of operation, the showing in Figure 1 is believed to be more readily comprehensible. The energy from transmitter 10 radiated from rotating antenna 11 is radiated in a sharp directive beam of energy substantially along the axis of reflector 12 and directed toward airplane 30, for example. A small portion of the energy striking the airplane is reflected back to the receiving antenna 22 and applied to the receiving dipole 21. Since the two antennas are always directed simultaneously in the same direction, the airplane 30 is within the zone of maximum response of the receiving antenna. The energy picked up by the dipole 21 may then be applied to receiver 24 by means of transmission line TL' and after amplification and rectification detected in headphones 26. The response detected in the earphones 26 will be dependent in amplitude upon the relationship between the plane of polarization of the reflected energy arriving from the airplane 30 and the plane of polarization of the receiving dipole 21 at any particular instant.

By rotating the control of phase shifter 35, it is possible to so vary the instantaneous phase of motor M' that the antenna 21 is at right angles to the plane of polarization of the received energy for any distance between the system of the invention and the remote reflecting object. The variable control of phase shifter 35 may be suitably calibrated so as to enable a direct determination of the distance. In cases where the reflecting object inherently causes a shift in the plane of polarization of the reflected energy, the effect of the inherent shift may be overcome by rotating the two antennas 11 and 21 first in one direction and then in the other, and taking the mean of the two readings from the calibrated control of phase shifter 35 as an indication of the distance or range.

As intimated above, a preferred form of rotating antennas for the present invention is shown in Figures 2, 3, and 4. In Figure 2 there is shown in elevation and partly in section, an antenna structure including a disc shaped radiator 40 having a diametral dimension of the order of one-half of the operating wavelength. Energy to be radiated by such a disc may be induced therein with the plane of polarization in any direction in its own plane with equal facility. The polarization of the radiated energy is dependent only upon the geometry of the application of the feed. Thus if a feed point for the disc is rotated about the axis of the disc, the plane of polarization of the radiated energy is rotated. The radiating disc 40 is energized by the coupling between the teeth 41 on disc 40 and teeth 44 on the surrounding energizing structure. It will be noted from an inspection of Figures 2 and 3 that there is a different number of teeth 44 than the number of teeth 41. Due to the different numbers of teeth, there is at any instant only one point on the circumference of disc 40 where a tooth 41 is in exact alignment with a tooth 44 of the surrounding energizing structure. This point is at the bottom of Figure 3 and at the center of Figure 4, wherein the tooth structure has been developed along a straight line. The point of greatest coupling thus occurs at the bottom and the plane of polarization of the radiated energy is in the plane passing through that tooth and the center of disc 40. The coupling gradually decreases along the length of the circumference of disc 40 to a minimum at the top of the figure in Figure 3 and at the extreme ends of the showing in Figure 4. This is shown graphically by curve 45, in Figure 4. Now, the disc 40 will be considered as operating in a counter-clockwise direction as shown by the arrow in Figure 3. This is shown by the left-to-right arrow in Figure 4. A very small angular movement of disc 40 will bring the teeth to the left of the bottom in Figure 3 in alignment, while the coupling between the teeth at the bottom is decreased. Thus the plane of polarization of the received radiated wave is shifted by a considerable angle for only a very small angular rotation of disc 40. Rotating disc 40 half the angular distance between successive teeth brings the point of greatest coupling to the top of Figure 3. The original point of greatest coupling now has the lowest coupling. Thus the plane of polarization is rotated 180° for only a very few degrees rotation of disc 40.

The teeth 44 are constructed as part of a housing which either wholly or partially constitutes a centrally energized resonance cavity. The details of construction of the resonance cavity are shown in more detail in Figure 2 in sectional elevation. The cavity has an overall width of the order of one wavelength. It has turned over one-quarter wave portions at each end across which the energizing transmission lines $TL_1$ and $TL_2$ are connected. By shifting the point of connection of the center conductors of $TL_1$ and $TL_2$ along the length of quarter-wave portions 46 and 47, an impedance matching of the transmission lines to the antenna cavity may be allowed. The transmission lines $TL_1$ and $TL_2$ are connected together to a single output transmission line TL with the proper relative lengths of transmission line $TL_1$ and $TL_2$ to assure the proper phase of energization of the two ends of the cavity.

The modification of the present invention shown in Figure 5 utilizes generally the same equipment as described with reference to Figure 1, except that in this figure the antennas have been shown as of the form shown in Figures 2 and 3. In this modification the antennas are rotated by motors M and M' at slightly different speeds because of the interposition of gear boxes 81 and 82 having different gear ratios. Tone wheels 85 and 86 are provided on the rotating shafts of each of the antennas in order to obtain alternating current waves of frequencies proportional to the speed of rotation of the plane of polarization of each of the antennas. The two alternating current waves thus generated, of frequencies $f_t$ and $f_r$, are applied to a mixer 87 and the difference frequency obtained by their heterodyne. The difference frequency is passed through a phase shifter 88 and from there connected to the saw-tooth wave generator 90. The difference frequency thus controls the synchronization of generator 90. The output of generator 90 is applied to the horizontal deflection plates 90 of oscilloscope 110. Thus the difference in actual rotating speeds of the plane of polarization of the transmitted signal and the received antenna controls the horizontal sweep of the oscilloscope in such a way that the position along the sweep is proportional to the angle of deviation between the two antennas. The signal picked up by the receiving antenna and rectified and amplified in receiver 24 is applied to the vertical deflection plates 91 of oscilloscope 110. Thus the null in reception as the receiving antenna passes through a plane at 90° to the plane of the received signal is recorded as a dip in the distributed amplitude curve on the scale of the oscilloscope. The position of this dip in relation to a reference scale (not shown) on the screen of oscilloscope 110 is a measure of the distance between the equipment and the reflecting object to which the dip is due. Even though there may be a multiplicity of reflecting objects within the zone of maximum response of the antennas, it is thus possible to individually distinguish between these targets.

While I have illustrated several embodiments of the present invention, it should be clearly understood that it is not limited thereto since many modifications may be made in the several elements employed and in their arrangement and it is therefore contemplated by the appended claims to cover any such modifications as fall within the spirit and scope of the invention.

What I claim is:

1. An obstacle detection system including an antenna for radiating a beam of radiant energy of constantly varying polarization toward said object, antenna means for receiving energy reflected from said object and means for comparing the polarization of said received energy with that radiated whereby a measure is obtained as to the distance from said system to said object, each of said antennas including a disc shaped radiator of such dimensions that it exhibits diametrical half-wave tuning, means for rotating said disc about its axis, said disc having a number of teeth around its periphery, a number of teeth differing from the number on said disc arranged around the circumference of said disc and in cooperative relationship with the teeth on said disc, and coupling means for high frequency energy connected to the second mentioned teeth.

2. An obstacle detection system including an antenna for radiating a beam of radiant energy of constantly varying polarization toward said object, antenna means for receiving energy reflected from said object and means for comparing the polarization of said received energy with that radiated whereby a measure is obtained as to the distance from said system to said object, each of said antennas including a disc shaped radiator of such dimensions that it exhibits diametrical half-wave tuning, means for rotating said disc about its axis, said disc having a number of teeth around its periphery, a number of teeth differing from the number on said disc arranged around the circumference of said disc and in cooperative relationship with the teeth on said disc, and coupling means for high frequency energy connected to the second mentioned teeth, one of the teeth on said disc always being in capacitive coupling arrangement with one of the teeth around said disc.

3. An obstacle detection system including an antenna for radiating a beam of radiant energy of constantly varying polarization toward said object, antenna means for receiving energy reflected from said object and means for comparing the polarization of said received energy with that radiated whereby a measure is obtained as to the distance from said system to said object, each of said antennas including a plane conductive sheet having channel members along at least a pair of opposing edges of said sheet, the depths of said channels being of the order of one-quarter of the operating wavelength, transmission lines coupled across said quarter-wave channels, the distance between said channels being of the order of one-half of the operating wavelength, a disc shaped radiator having a transverse dimension of the order of one-half of the operating wavelength rotatably mounted over the open space between said channels, said disc carrying a number of teeth arranged around, and at a uniform distance from, the axis of rotation of said disc, a number of stationary teeth differing from the number carried by said disc uniformly spaced around the axis of rotation of said disc and in coupling relation with the teeth carried by said disc, said stationary teeth being connected to said plane conductive sheet.

4. An obstacle detection system including a transmitting antenna having means for rotating the plane of polarization of the signal radiated therefrom at a predetermined rate, a directive receiving antenna having means for rotating the plane of polarization to which said antenna is most responsive at a different rate whereby the phase of the plane of polarization of the second of said antennae with respect to the first of said antennae is varied, and means for determining the relative angular displacement between said antennae for a predetermined response in a receiver connected to the second of said antennae, one of said rotating means comprising a radiator capable of having energy induced therein equally well in any direction in the plane of said radiator, means for rotating said radiator, means for coupling said radiator to a source of high frequency energy and means for causing the direction in which said energy is induced in said radiator to progress around said radiator as said radiator is rotated.

5. An obstacle detection system including a directive transmitting antenna having means for rotating the plane of polarization of the signal radiated therefrom at a predetermined rate, a directive receiving antenna having means for rotating the plane of polarization to which said antenna is most responsive at a different rate whereby the angular relationship of the plane of polarization of the second of said antennae with respect to the first of said antennae is cyclically varied, and means for determining said relationship for a predetermined response in a receiver connected to the second of said antennae, one of said means for rotating the plane of polarization comprising a rotatable disc conductor bearing a number of coupling members uniformly spaced about the axis thereof, a number of stationary coupling members uniformly spaced about the axis of rotation of said disc conductor, the number of said stationary members being different from the number of said rotatable disc conductor members, and means for coupling a high frequency energy transducer to said stationary coupling members.

6. An obstacle detection system including means for radiating a beam of radiant energy having a polarization varying in direction at a predetermined rate toward said object, means for receiving energy reflected from said obstacle, and means for comparing the polarization of said received energy with that radiated whereby a measure is obtained as to the distance from said system to said obstacle, said radiating means and said receiving means each comprising a radiator in the form of a disc capable of having energy induced therein equally well in any direction of the plane of said radiator, means for rotating said radiator means disc and in said receiving means disc at different rates, means for coupling said radiator means disc to a source of high frequency energy, and coupling means whereby high frequency energy may be supplied to said receiving means disc, each of said coupling means including coupling elements on each of said discs and stationary coupling elements arranged in cooperative association therewith, the number of coupling elements on a disc and the number of stationary coupling elements cooperating therewith being different.

NILS E. LINDENBLAD.

REFERENCES CITED

The following references are of record in the file of this patent:

UNITED STATES PATENTS

| Number | Name | Date |
|---|---|---|
| 1,828,705 | Kolster | Oct. 20, 1931 |
| 2,174,353 | Roberts | Sept. 26, 1939 |
| 2,227,598 | Lyman et al. | Jan. 7, 1941 |
| 2,248,727 | Strobel | July 8, 1941 |
| 2,268,643 | Crosby | Jan. 6, 1942 |
| 2,366,621 | Hineline | Jan. 2, 1947 |
| 2,421,028 | King | May 27, 1947 |
| 2,423,644 | Evans | July 8, 1947 |